Patented May 16, 1939

2,158,374

UNITED STATES PATENT OFFICE 2,158,374

SOLUBLE OILS

David R. Merrill, Long Beach, Calif., assignor to Union Oil Company of California, Los Angeles, Calif., a corporation of California No Drawing. Application January 27, 1936, Serial No. 61,054

12 Claims. (Cl. 252—6)

This invention relates to soluble oils, particularly adapted for use as emulsifiable spray oils employed in the spraying of citrus fruits and foliage and the like, and for similar uses such as the oiling of textiles and for metal working oils including cutting oils.

The object of the invention is to produce an emulsifiable oil composition of the spray oil type which will produce emulsions sufficiently stable to maintain a good emulsified form while in the spraying apparatus but sufficiently course (and to that extent unstable) so that they will break readily upon the plant or fruit.

Another object is to use materials which permit the composition to be emulsified more readily with water and which impart enhanced wetting and spreading properties.

The present invention resides primarily in the employment of polar compounds which are substantially insoluble both in water and in the mineral spray oils with which they are used, a free hydroxyl group of the acid radial being retained, and all hydroxyls in any attached groups (such as glycerol) being substituted, for example raw castor oil (glycerol tri-ricinoleate). Preferably, though not necessarily, the carboxyl groups are wholly or partly modified against formation of salts as by esterification or the like. The invention also resides in a soluble oil composition comprising such polar compounds and a mineral oil such as a mineral spray oil in combination with a common solvent (such as ethers, alcohols, ether-alcohols or the like), and also in an emulsion comprising such a soluble oil, water and an emulsifier of the type represented by albumen and casein, and others hereinafter mentioned.

The polar compounds employed in practicing the present invention are neither freely soluble in the mineral spray oil with which they are used nor in the water employed in producing the emulsion. Therefore they require the use of a common solvent of the type including ethers, alcohols, phenols, ketones, esters, ether-alcohols, ether-alcohol esters and hydroxy amines, together with appropriate derivatives of these materials. These non-oil-soluble and non-water-soluble polar compounds, when properly combined in the mineral spray oil, permit the composition to be emulsified more readily with water and impart enhanced wetting and spreading characteristics to the product. The type of polar compound of this invention comprises higher hydroxy acids or derivatives of higher hydroxy acids in which at least one hydroxyl group in the acid molecule remains free, and preferably wherein the carboxyl groups, at least in part, are prevented from forming salts as by esterification or otherwise, and wherein hydroxyl groups of any additives to the acid molecule are all replaced by some radical free from hydroxyl groups. Thus, raw castor oil may be employed which consists predominantly of glycerol tri-ricinoleate; or a partially heat treated castor oil may be employed where the heat treatment is not sufficient to impart substantial solubility in mineral oil, the oil thereby consisting of glycerol tri-ricinoleate and polymerization or kindred products thereof. With this class of materials all of the OH groups of the glycerol radical have been replaced, the free OH group required being in the acid molecule. Again, castor oil fatty acids may be employed, which includes recinoleic acid.

Also similar hydroxy acids and the derivatives of such acids where the acids contain over ten carbon atoms, may be used. In employing these materials the carboxyl groups may be wholly or partially esterified, but at least one hydroxyl group in the hydroxy acid member of the molecule is to be free as above indicated. Such other hydroxy acids will include, for example, the hydroxy derivatives of the unsaturated fatty acids, oleic, linoleic and linolenic acids, and the like, as well as such acids produced from petroleum oils and waxes by oxidation.

While the higher hydroxy acids or their derivatives, as above described are highly desirable in production of mineral oil emulsions, because of the superior wetting, spreading and emulsifying characteristics which they impart, nevertheless because of their limited solubility in the mineral oil, it is necessary to use a common solvent in order to produce a composition which will not separate on standing and before addition to the water to produce the desired emulsion. Such common solvents will in general be found in the class of lower oxygenated organic compounds which have appreciable solubility in the oil base to be employed. Examples of such compounds are alcohols, such as anhydrous ethyl alcohol, butyl alcohol, cyclohexanol, octyl alcohol, and the phenols, such as phenol, cresols, xylenols, as well as the terpene alcohols, such as terpineol, borneol, and alcohols of multiple function such as the keto alcohols; ketones, such as acetone, methyl ethyl ketone, butyl ketone, and the ketonic terpene derivatives, such as camphor; esters, such as ethyl acetate, diethyl phthalate, and butyl acetate; ethers, such as ethyl ether, isopropyl ether, butyl ether, and dioxan; ether alcohols, such as ethyl ether of ethylene glycol known as "cellosolve", diethylene glycol, monoethyl ether of diethylene glycol known as "carbitol"; ether alcohol esters, such as "cellosolve" acetate, "carbitol" acetate, diethylene glycol mono- and diactates, oleates, and naphthenates; and hydroxy amines such as triethanolamine.

If only a moderate degree of emulsification as by mechanical agitation of the oil composition with water is required as in the case of agricultural sprays, compounds of the character described may be used alone without the addition of soaps or other emulsifying agents, although if a composition more readily emulsifiable and giving emulsions of high stability is required, the inclusion of soaps or other emulsifying agents in the composition is often desirable, as in cutting oils. Moreover, such soaps will often act, in part at least, as common solvents and promote the miscibility of the substances described with the oil base. Suitable soaps are the alkali metal, ammonia, and amine or hydroxy amine salts of the higher fatty acids such as lauric and oleic acids, naphthenic acids, hydroxy acids such as ricinoleic acid, and the acid oxidation products of petroleum oils and waxes, abietic acid, and in general carboxylic acids of sufficiently high molecular weight so that their salts exhibit to a greater or lesser degree colloidal characteristics in water. The salts of the so-called sulfonated or sulfated acids, such as sulfated ricinoleic acid or oleic acid, and the sulfated higher alcohols, such as sulfated oleyl alcohol, may also be used. The triethanolamine soap of ricinoleic and of other higher hydroxy acids is worthy of particular mention as it combines the functions of soap as an emulsifying agent, triethanolamine as a compound promoting miscibility with the oil base, and the hydroxyl group of the hydroxy acid promoting emulsifying and wetting activity. Rosin or rosin oil may also be used either in its original or partially or totally saponified form, as it has some common solvent action.

In addition to the common solvents mentioned, there are numbers of substitute materials which will be obvious as equivalents to those skilled in the art. For example, chlorinated paraffin waxes may be employed because they promote the solubility of castor oil in mineral oils. Rape oil and lard oil are good common solvents in the case of castor oil.

In making and employing the composition in actual practice, the non-oil-soluble and non-water-soluble polar compound selected from the materials above described will be added to the mineral oil in quantities ordinarily approximating about 2% of the oil, although this may be varied from less than ½% to perhaps as much as 5% according to the uses to which the composition is to be put and to the particular compound selected. Similarly the common solvent employable ordinarily will approximate about 2% of the mineral oil employed, but this again will vary from perhaps 1% or less to several percent according to the hydroxy acid or acid derivative employed, or other factors. The mineral oil employed for these purposes will vary according to the type which would otherwise be selected. For instance, an oil frequently used for citrus fruit spraying is a highly refined "white" oil non-toxic to plant life, and similar oils have been suggested for such uses. For metal cutting oils, textile oils and the like, suitably refined mineral oils will be employed as well known in those arts.

In preparing emulsions from these materials, 2% emulsions are quite commonly employed in field apparatus where about 2% of the soluble oil composition is emulsified in water. Such emulsions maintain their stability in the apparatus in which they are generally used for adequate lengths of time to permit their application, this being particularly true in view of the fact that such devices are equipped with agitating mechanism. Another method of use is to add the soluble oil composition together with the other emulsifier employed, to a relatively small quantity of water, say 10% of the total which would be used in final emulsion, thereby producing a concentrated emulsion which later will be diluted with water down to the customary 2% or 3% concentration. These practices are well known and constitute no part of the present invention.

It is to be understood that disclosures of the present invention as herein given are to be considered as illustrative of the generic invention but not as limiting beyond the requirements of the following claims and the necessary limitations of the prior art.

I claim:

1. An emulsion containing water and a freely fluid emulsifiable oil comprising a mineral oil, a castor oil compound from the class consisting of castor oil fatty acids and their esters which are substantially insoluble in said mineral oil and in water and contain the free hydroxyl group in the hydrocarbon radical of the acid molecule, and a common solvent, said fatty acid compound and the common solvent each being present in a small proportion in the order of about 0.5% to about 5% of the mineral oil.

2. An emulsion according to claim 1 wherein the castor oil compound is a partially heat treated castor oil containing glyceryl tri-ricinoleates and resultant polymerized products.

3. An emulsion according to claim 1 wherein the castor oil compound is a castor oil fatty acid.

4. An emulsion according to claim 1 wherein the castor oil compound is esterified castor oil fatty acids.

5. An emulsion according to claim 1 wherein the castor oil compound is a lightly heat treated castor oil insufficiently heat treated to render the oil soluble.

6. An emulsion according to claim 1 containing a soap emulsifier.

7. An emulsion according to claim 1 containing a soap also having common solvent properties.

8. An emulsion according to claim 1 and a triethanolamine soap of a higher hydroxy acid.

9. An emulsion containing water and soluble oil comprising mineral spray oil, a compound of the class consisting of higher hydroxy fatty acids containing more than ten carbon atoms and the esters of such fatty acids, said compound being substantially insoluble in the oil and in water and containing the hydroxyl of the hydrocarbon molecule but being free from hydroxyls attached indirectly to the hydrocarbon molecule, and a common solvent, said compound and the common solvent each being present in small amount in the order of from 0.5% to 5% of the mineral oil.

10. An emulsion according to claim 9 wherein the mentioned hydroxy compound is a higher hydroxy fatty acid.

11. An emulsion according to claim 9 wherein the mentioned hydroxy compound is an ester of a higher hydroxy fatty acid.

12. An emulsion according to claim 9 wherein the mentioned hydroxy compound is an unsaturated hydroxy fatty acid.

DAVID R. MERRILL.